US007404195B1

(12) United States Patent
Sawicki et al.

(10) Patent No.: US 7,404,195 B1
(45) Date of Patent: Jul. 22, 2008

(54) PROGRAMMABLE OBJECT MODEL FOR EXTENSIBLE MARKUP LANGUAGE MARKUP IN AN APPLICATION

(75) Inventors: Marcin Sawicki, Kirkland, WA (US); Brian Jones, Redmond, WA (US); Robert Little, Redmond, WA (US); Mark Sunderland, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 768 days.

(21) Appl. No.: 10/731,634

(22) Filed: Dec. 9, 2003

(51) Int. Cl.
*G06F 3/00* (2006.01)
*G06F 7/00* (2006.01)
(52) U.S. Cl. .......................... 719/328; 707/1
(58) Field of Classification Search ............... 719/328; 707/1
See application file for complete search history.

(56) References Cited

U.S. PATENT DOCUMENTS

| | | | |
|---|---|---|---|
| 4,674,065 A | 6/1987 | Lange et al. ............ 382/311 |
| 4,868,750 A | 9/1989 | Kucera et al. ............ 711/2 |
| 5,020,019 A | 5/1991 | Ogawa ............ 707/5 |
| 5,128,865 A | 7/1992 | Sadler ............ 704/2 |
| 5,159,552 A | 10/1992 | van Gasteren et al. ............ 704/1 |
| 5,267,155 A | 11/1993 | Buchanan et al. ............ 715/540 |
| 5,317,546 A | 5/1994 | Balch et al. ............ 368/9 |
| 5,337,233 A | 8/1994 | Hofert et al. ............ 715/540 |
| 5,341,293 A | 8/1994 | Vertelney et al. ............ 715/530 |
| 5,351,190 A | 9/1994 | Kondo ............ 704/8 |
| 5,392,386 A | 2/1995 | Chalas ............ 715/841 |
| 5,446,891 A | 8/1995 | Kaplan et al. ............ 395/600 |
| 5,541,836 A | 7/1996 | Church et al. ............ 704/7 |
| 5,596,700 A | 1/1997 | Darnell et al. ............ 715/512 |
| 5,617,565 A | 4/1997 | Augenbraun et al. ............ 395/604 |
| 5,625,783 A | 4/1997 | Ezekiel et al. ............ 395/352 |
| 5,627,958 A | 5/1997 | Potts et al. ............ 715/708 |
| 5,634,019 A | 5/1997 | Koppolu et al. ............ 715/744 |
| 5,640,560 A | 6/1997 | Smith ............ 395/615 |
| 5,657,259 A | 8/1997 | Davis et al. ............ 708/204 |
| 5,708,825 A | 1/1998 | Sotomayor ............ 395/762 |
| 5,717,923 A | 2/1998 | Dedrick ............ 395/613 |
| 5,752,022 A | 5/1998 | Chiu et al. ............ 395/610 |

(Continued)

FOREIGN PATENT DOCUMENTS

EP 0481784 A2 4/1992

(Continued)

OTHER PUBLICATIONS

"Altova markup your mind!" http://web.archive.org/web/20021204211721/http://altova.com/products_ide.html, Dec. 2002, pp. 1-3.

(Continued)

*Primary Examiner*—William Thomson
*Assistant Examiner*—Lechi Truong
(74) *Attorney, Agent, or Firm*—Merchant & Gould P.C.

(57) ABSTRACT

A programmable object model allows a user/programmer to programmatically access the Extensible Markup Language (XML) functionality of a software application. The programmable object model is comprised of a plurality of object-oriented message calls or application programming interfaces for allowing a user to access the XML functionality of an application by sending one or more object-oriented message calls or application programming interfaces to the XML functionality of a given application along with any required parameters for customizing or otherwise manipulating XML markup applied to a document.

37 Claims, 4 Drawing Sheets

U.S. PATENT DOCUMENTS

| | | | |
|---|---|---|---|
| 5,761,689 A | 6/1998 | Rayson et al. | 707/533 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,826,025 A | 10/1998 | Gramlich | 395/200.47 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,892,919 A | 4/1999 | Nielsen | 395/200.58 |
| 5,893,073 A | 4/1999 | Kasso et al. | 705/8 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,498 A | 8/1999 | Schneck et al. | 705/54 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,028,605 A | 2/2000 | Conrad et al. | 345/840 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,085,201 A | 7/2000 | Tso | 717/505 |
| 6,092,074 A | 7/2000 | Rodkin et al. | 707/102 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,219,698 B1 | 4/2001 | Iannucci et al. | 709/221 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,292,768 B1 | 9/2001 | Chan | 704/1 |
| 6,295,061 B1 | 9/2001 | Park et al. | 715/764 |
| 6,308,171 B1 | 10/2001 | De La Huerga | 707/3 |
| 6,311,177 B1 | 10/2001 | Dauerer et al. | 707/2 |
| 6,311,194 B1 | 10/2001 | Sheth et al. | 715/505 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe | 709/203 |
| 6,338,059 B1 | 1/2002 | Fields et al. | 707/4 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,516,321 B1 | 2/2003 | De La Huerga | 707/102 |
| 6,519,603 B1 | 2/2003 | Bays et al. | 707/102 |
| 6,546,433 B1 | 4/2003 | Matheson | 709/318 |
| 6,556,984 B1 | 4/2003 | Zien | 707/2 |
| 6,571,241 B1 | 5/2003 | Nosohara | 707/6 |
| 6,618,733 B1 | 9/2003 | White et al. | 707/103 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,633 B2 * | 11/2003 | Chau et al. | 707/1 |
| 6,658,623 B1 | 12/2003 | Schilit et al. | 715/513 |
| 6,687,485 B2 | 2/2004 | Hopkins et al. | 434/350 |
| 6,697,824 B1 | 2/2004 | Bowman-Amuah | 709/229 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,745,208 B2 | 6/2004 | Berg et al. | 707/201 |
| 6,779,154 B1 * | 8/2004 | Nussbaum et al. | 715/523 |
| 6,795,808 B1 | 9/2004 | Strubbe et al. | 704/275 |
| 6,826,726 B2 | 11/2004 | Hsing et al. | 715/513 |
| 6,868,525 B1 | 3/2005 | Szabo | 715/738 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,925,457 B2 | 8/2005 | Britton et al. | 707/1 |
| 6,925,470 B1 | 8/2005 | Sangudi et al. | 707/102 |
| 6,948,133 B2 | 9/2005 | Haley | 715/781 |
| 2001/0029605 A1 | 10/2001 | Forbes et al. | 717/11 |
| 2001/0041328 A1 | 11/2001 | Fisher | 434/157 |
| 2001/0056461 A1 | 12/2001 | Kampe et al. | 709/201 |
| 2002/0004803 A1 | 1/2002 | Serebrennikov | 715/513 |
| 2002/0007309 A1 | 1/2002 | Reynar | 705/14 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156792 A1 | 10/2002 | Gombocz et al. | 707/100 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |

| | | | | |
|---|---|---|---|---|
| 2003/0025728 | A1 | 2/2003 | Ebbo et al. | 345/744 |
| 2003/0051236 | A1 | 3/2003 | Pace et al. | 717/177 |
| 2003/0056207 | A1 | 3/2003 | Fischer et al. | 717/174 |
| 2003/0081791 | A1 | 5/2003 | Erickson et al. | 380/282 |
| 2003/0084138 | A1 | 5/2003 | Tavis et al. | 709/223 |
| 2003/0097318 | A1 | 5/2003 | Yu et al. | 705/35 |
| 2003/0101204 | A1 | 5/2003 | Watson | 708/206 |
| 2003/0101416 | A1 | 5/2003 | McInnes et al. | 715/513 |
| 2003/0106040 | A1 | 6/2003 | Rubin et al. | 717/106 |
| 2003/0121033 | A1 | 6/2003 | Peev et al. | 717/175 |
| 2003/0126136 | A1 | 7/2003 | Omoigui | 707/10 |
| 2003/0140308 | A1 | 7/2003 | Murthy et al. | 715/500 |
| 2003/0145197 | A1* | 7/2003 | Lee et al. | 713/155 |
| 2003/0154144 | A1 | 8/2003 | Pokomy et al. | 705/28 |
| 2003/0158841 | A1 | 8/2003 | Britton et al. | 707/3 |
| 2003/0158851 | A1 | 8/2003 | Britton et al. | 707/100 |
| 2003/0172343 | A1 | 9/2003 | Leymaster et al. | 715/500 |
| 2003/0192040 | A1 | 10/2003 | Vaughan | 717/173 |
| 2003/0212527 | A1 | 11/2003 | Moore et al. | 702/179 |
| 2003/0220795 | A1 | 11/2003 | Araysantiparb et al. | 704/275 |
| 2003/0229593 | A1 | 12/2003 | Raley et al. | 705/55 |
| 2003/0233330 | A1 | 12/2003 | Raley et al. | 705/55 |
| 2004/0003389 | A1 | 1/2004 | Reynar et al. | 717/178 |
| 2004/0006741 | A1 | 1/2004 | Radja et al. | 715/513 |
| 2004/0165007 | A1 | 8/2004 | Shafron | 345/781 |
| 2004/0199861 | A1 | 10/2004 | Lucovsky | 715/500 |
| 2004/0236717 | A1 | 11/2004 | Demartini et al. | 707/1 |
| 2005/0050164 | A1 | 3/2005 | Burd et al. | 709/217 |
| 2005/0055330 | A1 | 3/2005 | Britton et al. | 707/1 |
| 2005/0120313 | A1 | 6/2005 | Rudd et al. | 715/866 |
| 2005/0187926 | A1 | 8/2005 | Britton et al. | 707/3 |

FOREIGN PATENT DOCUMENTS

| | | |
|---|---|---|
| EP | 0598511 A2 | 5/1994 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| WO | WO 95/07510 A1 | 3/1995 |
| WO | WO 99/17240 | 4/1999 |
| WO | WO 01/18687 A1 | 3/2001 |
| WO | WO 01/37170 A2 | 5/2001 |
| WO | WO 01/18639 A2 | 11/2001 |
| WO | WO 02/99627 A1 | 1/2002 |
| WO | WO 02/15518 A2 | 2/2002 |

OTHER PUBLICATIONS

Apple Data Detectors Users's Manual Apple Computer, Inc., 1997, pp. 1-15.
Arbortext, "Arbortext and Accessibility", http://web.archive.org/web/20021219133536/www.arbortext.com/html/accessibility.html, Dec. 2002, pp. 1-5.
Arbortext, "Arbortext's Support for XSL-FO", http://web.archive.org/web/20021221021632/www.arbortext.com/html/xsl-fo.html. Dec. 2002, pp. 1-4.
Arbortext, "Schemas", http://web.archive.org/web/20021221023148/www.arbortext.com/html/schemas.html, Dec. 2002, pp. 1-3.
Arbortext, "XML Compliance, 100% Pure XML", http:web.archive.org/web/20021209185855/www.arbortext.com/html/xml_compliance, Dec. 2002, pp. 1-3.
Barrett, Rob, Paul P. Maglio and Daniel C. Kellem; *How to personalize the Web*; Conference proceedings on human factors in computing systems (1997) p. 75-82.
"Being 'Smart' with Smart Tags in Office XP", Create for Mississippi, Aug. 2001, http://www.create.cett.msstate.edu/create/howto/smart_tags.pdf, 7 pp.
Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester M13 9PL, UK, pp. 1-12, publication date unknown.
Bischof, Hans-Peter, "Spell, Spellin, Spellout—Finding Spelling Errors", http://www.vorlesungen.uni-osnabrueck.de/informatik/shellscript/Html/Man/_Man_NeXT_html/html..., Apr. 21, 1997, 2 pp.
"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.
"BizTalk Server 2002 Mapper User Interface", http://msdn.microsoft.com/library/en-us/bts_2002/html/lat_xmltools_map_concept_codw..., Microsoft Corporation, 1999-2001, pp. 1.
"BizTalk Server 2002 Testing Maps", http://msdn.microsoft.com/library/en-us/bts_2002/html/lat_xmltools_map_concept_fhhy.a..., Microsoft Corporation, 1999-2001, pp. 1-2.
"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.
Bonifati A., "Active Behaviors within XML Document Management", EDBT PH. D. Workshop, Mar. 2000, pp. 1-4.
Boone, "Concept Features in Re: Agent, An Intelligent Email Agent", Proceedings of the 2nd International Conference on Autonomous Agents, May 9-13, 1998, pp. 141-148.
Bosak, "XML: The Universal Publishing Format", SGML/XML Europe '98, May 1998, pp. A1-C17.
Braganholo V., "Updating Relational Databases Through XML Views", Technical Report, Sep. 2002, pp. 1-61.
Brockschmidt, K., "Inside OLE, Second Edition", 1995, Microsoft Press, p. 169.
Brooks-Bilson, "Programming ColdFusion" [electronic resource] 2001, Safari Tech Books Online, 1st Edition, 25 pp.
Ceri S. et al., "Deriving Production Rules for Incremental View Maintenance", Proceedings of the 17th International Conference on Very Large Data Bases, Sep. 1991, pp. 577-589.
"Chapter 8—Standard Input and Output", http://www.comp.lancs.ac.uk/computing/users/eiamjw/unix/chap8.html, 3 pp., publication date unknown.
Claris Em@ailer Getting Started User's Guide, For Macintosh, Claris, Corporation, 1995-1997, 61 pp.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
Corel, "Corel XMetal 4 and Interwoven TeamXML", http://web.archive.org/web/2003080721225/www.corel.com/futuretense_cs/ccurl/corel+xml+4+and+interwoven+teamxml.pdf, Aug. 2003, pp. 1-2.
Corel, "Corel XMetal4, Making XML Content Creation Easy", http://web.archive.org/web/20031118215158/www.corel.com/servlet/Satellite?pagename, Nov. 2003, pp. 1-2.
Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.
Corel® Office Professional 7 Quick User's Manual, vol. 1, Version 7.0 (first printing), Corel Corporation, Limited, pp. 1-531, publication date unknown.
Cornell, Paul, "Developing Smart Tag DLLS", MSDN Library, http://msdn.microsoft.com/library/default.asp?url=/library/en-us/dnsmarttag/html/odc_smarttags.asp, Apr. 2001, pp. 8.
Desmarais, Michel C. and Jiming Liu; *Exploring the applications user-expertise assessment for intelligent interfaces*; Proceedings of the conference on human factors in computing systems, (1993) p. 308-313.
Devanbue, P. et al., "Chime: customizable hyperlink insertion and maintenance engine for software engineering environments", Software Engineering, Publication date: 1999, ISBN: 1-58113-07400.
Developer's Guide To Apple Data Detectors, For Version 1.0.2, Apple Computer, Inc., 1997, pp. 1-33.
Driza, Scott, "Learn Word 2000 VBA Document Automation", Wordware Publishing Inc., 2001, 6 pp.

Falquet G. et al., "Design and Analysis of Active Hypertext Views on Databases", Information Sciences Institute, Jan. 2002, pp. 1-24.

Fan et al., "FormPlus: A Form Authoring Toolkit", Proceedings of the Fourteenth Annual Computer Software and Applications Conference, Oct. 13-Nov. 2, 1990, pp. 255-260.

"Featuring Adobe® FrameMaker 6.0", Adobe Systems Incorporated, San Jose, CA, Apr. 2000, 4 pp.

Fernandez M. et al., "SilkRoute: trading between relations and XML", Computer Networks, vol. 33, No. 1-6, Jun. 2000, pp. 723-745.

Flanagan, D., "JavaScript—The Definitive Guide, Fourth Edition", Jan. 2002, O'Reilly, 12 pp.

Foley, James D.; *Future directions in user-computer interface software*; Conference proceedings on organizational computer systems, (1991) p. 289-297.

Foley, Jim; *Integrating computer technology, people technology; strategies and case studies from Georgia Tech's Graphics, Visualization and Usability Center*; Proceedings of the workshop on advanced visual interfaces, (1994) p. 34-43.

Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.

*Getting Results With Microsoft® Office 97, Real World Solutions For The Work You Do*, Microsoft Corporation, 1995-1997, pp. 1-703.

Glushko, Robert J., Jay M. Tenenbaum and Bart Meltzer; *An XML framework for agent-based E-commerce*; Commun. ACM 42, 3 (Mar. 1999) p. 106.

Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.

"Handout 38: Spell Checking, Word Counting, and Textual Analysis", http://courses.cs.emporia.edu/pheattch/course/2002/cs501s02/hand38/, 3 pp., publication date unknown.

Harold, E.R., "XML: Extensible Markup Language", IDG Books Worldwide, Books 24×7.com printout, 1998, 20 pp.

Hartson, H. Rex and Deborah Hix; *Human-computer interface development: concepts and systems for its management*; ACM Comput. Surv. 1 (Mar. 1989) p. 5-92.

Hewkin, "Smart Tags-the Distributed-Memory Resolution", IEEE Review, Jun. 22, 1989, pp. 203-206.

Homer, Alex et al., Professional Active Services Pages, 1997, Wrox Press Ltd., Section"Client-Side Scripting and Components", subsection "Choosing Your Applets, and Controls", 16 pp.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

IBM Corporation, IBM Research Disclosure #368; "Multimedia Hyperlinks Automatically Created For Reference Documents," *IBM Technical Disclosure Bulletin*, Jun. 1993, pp. 1-5.

IBM Technical Disclosure Bulletin, "National Language Support Enhancement for Culture-Specific Operations", Nov. 1, 1993, vol. 36, Issue 11, pp. 629-638.

*InfoCentral™ 7*, User's Manual, Corel Corporation, vol. 1, Version 7.0, 1996, pp. 1-86.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Integrated Development Environment (IDE)", http://web.archive.org/web/20020602032242/http:altova.com/products_ide.html, Jun. 2002, pp. 1-2.

"Integrating with External Systems: iPlanet™ Unified Development Server", Sun Microsystems, Inc., Ver. 5.0, Aug. 2001, pp. 127-156.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

Ispell 4, "Ispell—Format of Ipsell Dictionaries and Affix Files", http://www.bigbiz.com/cgi-bin/manpage?4+ispell, 11 pp., publication date unknown.

Kristensen, "Template Resolution in XML/HTML", Computer Networks and ISDN Systems, vol. 30, 1998, pp. 239-249.

Kuenning, Geoff, "International Spell", http://fmg-www.cs.ucla.edu/geoff.ispell.html, 3 pp., publication date unknown.

Kuenning, Geoff, "Using ISPELL from Emacs", http://theochem.ki.ku.dk/on_line_docs/ispell/ispell_1.html, 4 pp., publication date unknown.

Kukich, Karen; *Technique for Automatically Correcting Words in Text*; ACM Comput. Surv., 24, 4 (Dec. 1992); pp. 377-439.

Marais, Hannes, "Supporting Cooperative and Personal Surfing With a Desktop Assistant", 1997, ACM Press, pp. 129-138.

Martensson, Bengt, "Thread-Enhanced Spell Front End for GNU Emacs+Detex+Delatex", http://www.geocrawler.com/archives/3/337/1987/8/0/1871981/, Aug. 20, 1987, 1 page.

Marx, Matt and Chris Schmandt; *Putting People First: Specifying Proper Names in Speech Interfaces*; Proceedings of the ACM Symposium on User Interface Software and Technology; 1994; pp. 29-37.

Marx, Matthew and Chris Schmandt; *Clues: dynamic personalized message filtering*; Proceedings of the ACM 1996 conference on computer supported cooperative work (1996) p. 113-121.

McMahon, Lee. E., "SED—A Non-Interactive Text Editor," Bell Laboratories, Murray Hill, New Jersey 07974, Aug. 15, 1978, p. 16.

Measuring Units Conversion Table—http://web.archie.org- 1997 Internet French Property, pp. 1-4.

Menu Customizing, IBM Technical Disclosure Bulletin, vol. 34, No. 1, Jun. 1991, pp. 91-92 (4 pp. total).

"Microsoft BizTalk Server 2002—Using BizTalk Mapper", http://msdn.Microsoft.com/library/en-us/bts_2002/htm/lat_xmltools_map_intro_zkqb.asp. . . , Microsoft Corporation, 1999-2001, pp. 1-2.

*Microsoft Computer Dictionary*, Microsoft, Microsoft Press, Fifth Edition, p. 409.

"Microsoft Extends XML Web Services Support in .Net Enterprise Servers Through Visual Studio .Net", http://www.microsoft.com/presspass/press/2002/feb02/02-13servervspr.mspx, Microsoft Corporation, Feb. 2002, pp. 1-3.

"Microsoft Unveils Visual Studio.Net Enterprise Tools", Microsoft Corporation, http://microsoft.com/presspass/press/2001/may01/05-21 vseepr.mspx, May 2001, pp. 1-4.

"Module 123—Spell", http://duplex.hypermart.net/books/bsd/501-504.html, 4 pp., publication date unknown.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Panagiotis, Christias, Man-cgi 1.15, http://www.calpoly.edu/cgi-bin/man-cgi?spell+1, 1994, 3 pp.

Panagiotis, Christias, Man-cgi 1.15, http://www.physics.umn.edu/cgi-bin/man-cgi?spell, 1994, 5 pp.

Pentland, Alex; *Perceptual user interfaces: perceptual intelligence*; Commun. ACM 43, 3 (Mar. 2000) p. 35-44.

Perry, Brad, et al., "Discovering Similar Resources by Content Park-Linking", Proceedings of the Sixth International Conference on Information and Knowledge Management, published by ACM Press 1997, pp. 317-324.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

Quin, Liam, "Extensible Markup Language (XML)", W3C Architecture Domain, http://web.archive.org/web/2002121962057/http://www.w3.org/XML/, 1996-2002, pp. 1-3.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

"Smart Tags: Dumb Technology?", webreference.com, Online, Aug. 29, 2001, http://www.webreference.com/xml/column30/3.html, 3 pp.

"Spellout Command", Commands Reference, vol. 5, http://www.rz.uni-hohenheim.de/betriebssysteme/unix/aix/aix_4.3.3_doc/base_doc/usr/ share/man/inf. . . , 1 page, publication date unknown.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Sriram, V., "ComponentXchange: An E-Exchange for Software Components", Master Thesis, CiteSeer, May 2001, pp. i-v, 1-77.

Stairmand, Mark A.; *Textual context analysis for information retrieval*; Proceedings of the 20th annual international ACM SIGIR conference on research and development in information retrieval (1997) p. 140-147.

Takkinen et al., "Café: A Conceptual Model for Managing Information in Electronic Mail", Proceedings of the Annual Hawaii International Conference on System Sciences, 1998, p. 44-53.

Terveen, Loren, Will Hill and Brian Amento; *Constructing, organizing, and visualizing collections of tropically related Web resources;* ACM Trans. Comput.-um. Interact. 6, 1 (Mar. 1999) p. 67-94.

*The Complete LINUX™ Operating System 5.2 Deluxe*, Red Hat, ® Macmillian Digital Publishing USA, A Viacom Company, Red Hat Software, Inc., ISBN 1-57595-199-1B, 1995-1998, pp. 1-385.

"The StarOffice™ 6.0 Suite: New Features Guide", Sun Microsystems, V. 1.1, Jul. 2002, pp. 1-31.

Toth, V., "Visual C++4 Unleashed", 1996, Sams Publishing, p. 174.

Towers, J. Tarin, Visual Quickstart Guide: Dreamweaver 2 for Windows and Macintosh, 1999, Peachpit Press, pp. 150-151.

Tsai, M., P. Reiher and G.J. Popek; *Command management system for next-generation user input*; Proceedings of the seventh workshop on hottopics in operating systems, (1999) p. 179-84.

*User Manual For AddressMate and AddressMate Plus*, CoStar Corporation, AddressMate Software, 1994-1995, pp. 1-210.

"Using Flyswat", http://www.flywsat.com/using.html, download date: Sep. 28, 1999, 1 pp.

"What is Flyswat", http://www.flyswat.com, download date: Sep. 28, 1999, 5 pp.

Wilker, John, "ColdFusion MX Adds J2EE, XML, and Web Services Compatibility", Aug. 9, 2002, http://builder.com.com/5102-6387-104585.html, 3 pp.

Willisson, Pace, Ispell (1), "User Commands", http://www.csee.usf.edu/cgi-bin/man-cgi?ispell, 1983, 18 pp.

Willisson, Pace, Ispell (1), http://www.rt.com/man/findaffix.1.html, 1983, 15 pp.

* cited by examiner

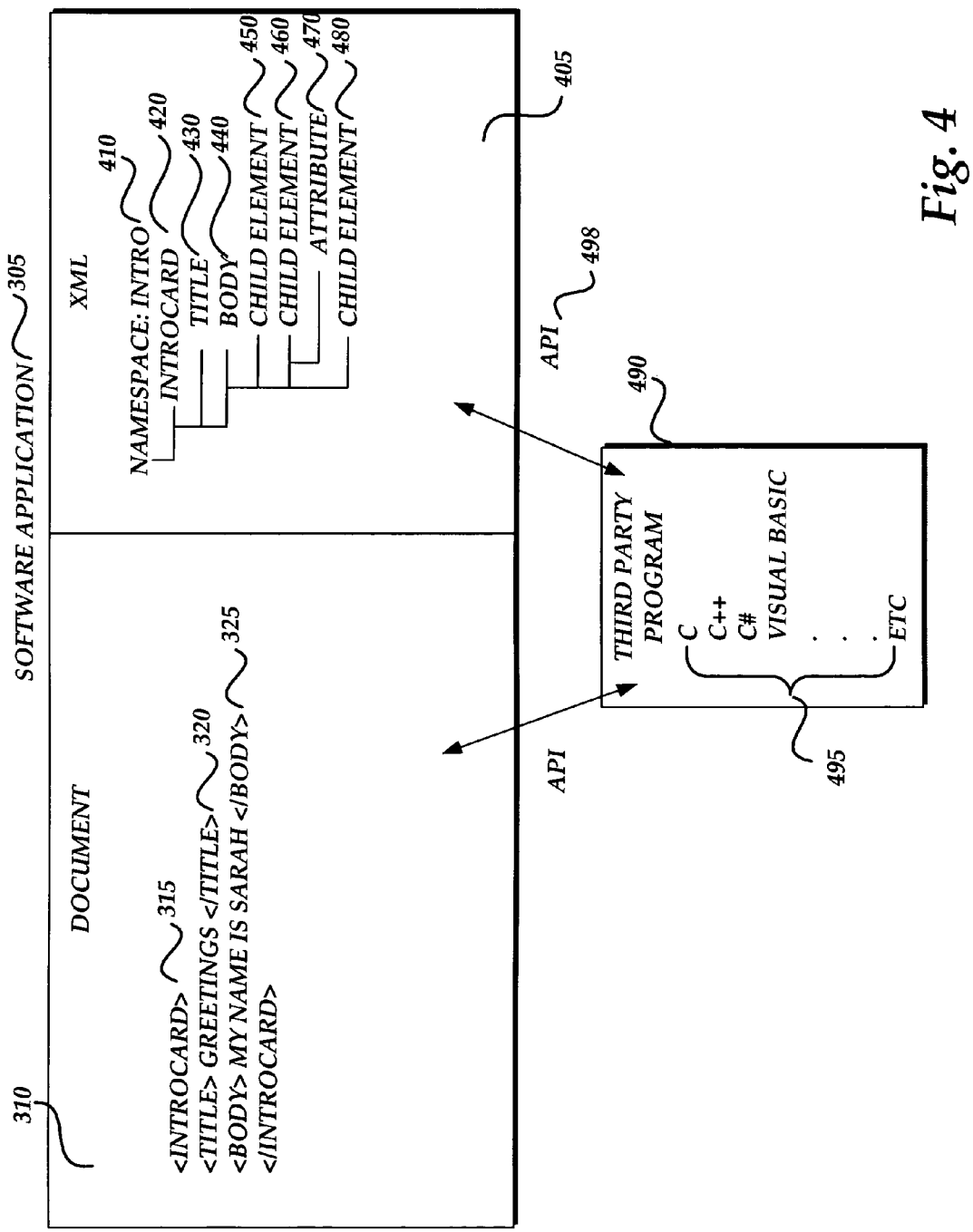

PROGRAMMABLE OBJECT MODEL FOR EXTENSIBLE MARKUP LANGUAGE MARKUP IN AN APPLICATION

RELATED APPLICATIONS

United States Utility patent application by applicant matter number 60001.0263US01/MS303917.1, entitled "Programmable Object Model for Extensible Markup Language Schema Validation," and United States Utility patent application by applicant matter number 60001.0270US01/MS303919.1, entitled "Programmable Object Model for Namespace or Schema Library Support in a Software Application," are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates to programmable object models. More particularly, the present invention relates to a programmable object model for Extensible Markup Language markup in a software application.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alphanumeric data. Such applications have a number of well known strengths including rich editing, formatting, printing, calculation and on-line and off-line editing.

Most computer software applications do not contain all necessary programming for providing functionality required or desired by every potential user. Many programmers often wish to take advantage of an existing application's capabilities in their own programs or to customize the functionality of an application and make it more suitable for a specific set of users or actions. For example, a programmer working in the financial industry may wish to customize a word processor for a user audience consisting of financial analysts editing financial reports. In recent years, the Extensible Markup Language has been used widely as an interchangeable data format for many users. A word processor or other application capable of receiving and editing XML data provides great value to its users. However, because the native .XML functionality of such an application is not exposed to users/programmers wishing to customize the functionality to further take advantage of the functionality for their own programs, such users/programmers are limited in their ability to utilize the XML functionality.

Accordingly, there is a need in the art for a programmable object model for allowing users/programmers to programmatically access the XML functionality of a software application in order to customize or otherwise modify the XML functionality to enhance their utilization of the functionality.

It is with respect to these and other considerations that the present invention has been made.

SUMMARY OF THE INVENTION

The present invention provides methods and systems for allowing a user to programmatically access the Extensible Markup Language (XML) functionality of a software application by providing a programmable object model. According to one aspect of the present invention, a programmable object model comprised of a plurality of object-oriented message calls or application programming interfaces is provided for allowing a user to access the XML functionality of an application by sending one or more object-oriented message calls or application programming interfaces to the XML functionality of a given application along with any required parameters for customizing or otherwise manipulating XML markup applied to a document. Once the user has access to the XML functionality of a given application, the user may insert or delete XML markup in arbitrary locations in the document, the user may access richly formatted contents in areas contained inside an XML element or node, the user may locate specific XML nodes or elements in a document using queries, and the user may control or otherwise manipulate the application's XML-related settings and properties.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 4 is a block diagram illustrating interaction between a third party application and the XML functionality of a software application.

DETAILED DESCRIPTION OF THE PREFERRED EMBODIMENT

Embodiments of the present invention are directed to methods and systems for allowing a user to programmatically call the Extensible Markup Language (XML) functionality of a software application for customizing, utilizing, and otherwise manipulating objects and properties of the XML functionality and for customizing, manipulating and enhancing the utilization of XML markup in a document. These embodiments may be combined, other embodiments may be utilized, and structural changes may be made without departing from the spirit or scope of the present invention. The following detailed description is therefore not to be taken in a limiting senses and the scope of the present invention is defined by the appended claims and their equivalents.

Figure 1:
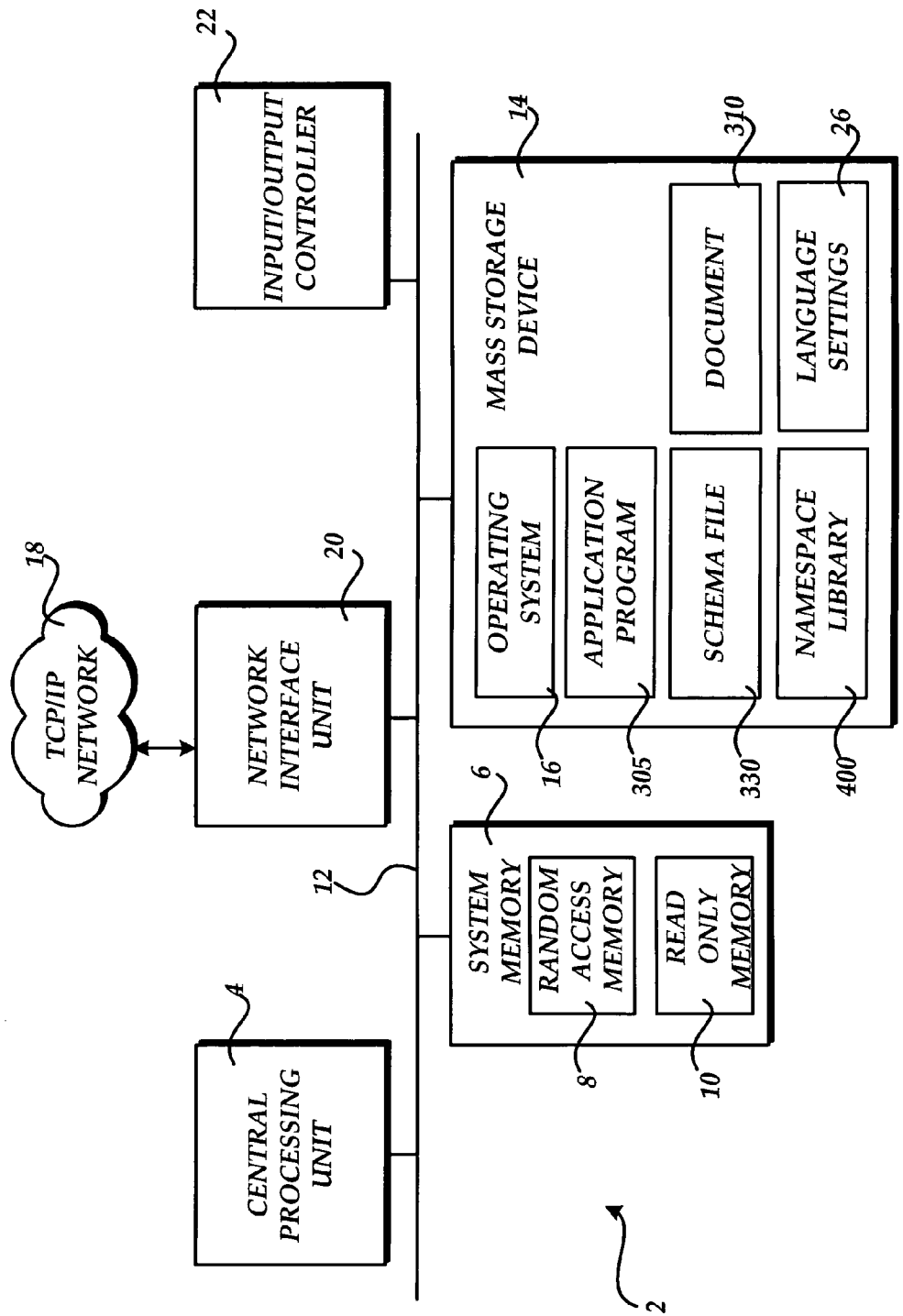
FIG. 1 is a simplified block diagram of a computing system and associated peripherals and network devices that provide an exemplary operating environment for the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 305, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 305 for creating and editing an electronic document 310. For instance, the application program 305 may comprise a word processing application program, a spreadsheet application, a contact application, and the like. Application programs for creating and editing other types of electronic documents may also be used with the various embodiments of the present invention. A schema file 330 and a namespace/schema library 400, described below, are also shown.

Figure 2:
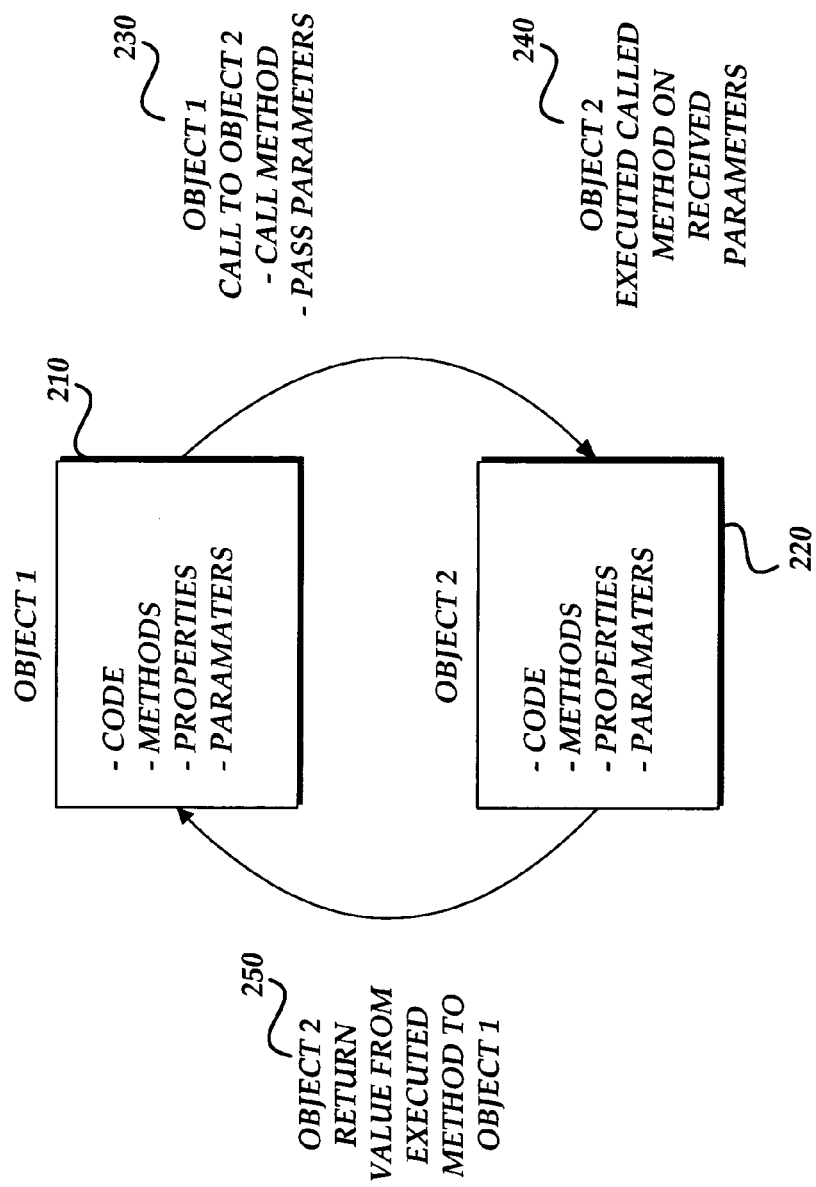
FIG. 2 is a simplified block diagram illustrating interaction between software objects according to an object-oriented programming model.

Exemplary embodiments of the present invention are implemented by communications between different software objects in an object-oriented programming environment. For purposes of the following description of embodiments of the present invention, it is useful to briefly to describe components of an object-oriented programming environment. FIG. 2 is a simplified block diagram illustrating interaction between software objects according to an object-oriented programming model. According to an object-oriented programming environment, a first object 210 may include software code, executable methods, properties, and parameters. Similarly, a second object 220 may also include software code, executable methods, properties, and parameters.

A first object 210 may communicate with a second object 220 to obtain information or functionality from the second object 220 by calling the second object 220 via a message call 230. As is well know to those skilled in the art of object-oriented programming environment, the first object 210 may communicate with the second object 220 via application programming interfaces (API) that allow two disparate software objects 210, 220 to communicate with each other in order to obtain information and functionality from each other. For example, if the first object 210 requires the functionality provided by a method contained in the second object 220, the first object 210 may pass a message call 230 to the second object 220 in which the first object identifies the required method and in which the first object passes any required parameters to the second object required by the second object for operating the identified method. Once the second object 220 receives the call from the first object, the second object executes the called method based on the provided parameters and sends a return message 250 containing a value obtained from the executed method back to the first object 210.

For example, in terms of embodiments of the present invention, and as will be described below, a first object 210 may be a third party customized application that passes a message to a second object such as an Extensible Markup Language schema validation object whereby the first object identifies a method requiring the validation of a specified XML element in a document where the specified XML element is a parameter passed by the first object with the identified method. Upon receipt of the call from the first object, according to this example, the schema validation object executes the identified method on the specified XML element and returns a message to the first object in the form of a result or value associated with the validated XML element. Operation of object-oriented programming environments, as briefly described above, are well known to those skilled in the art.

Figure 3:
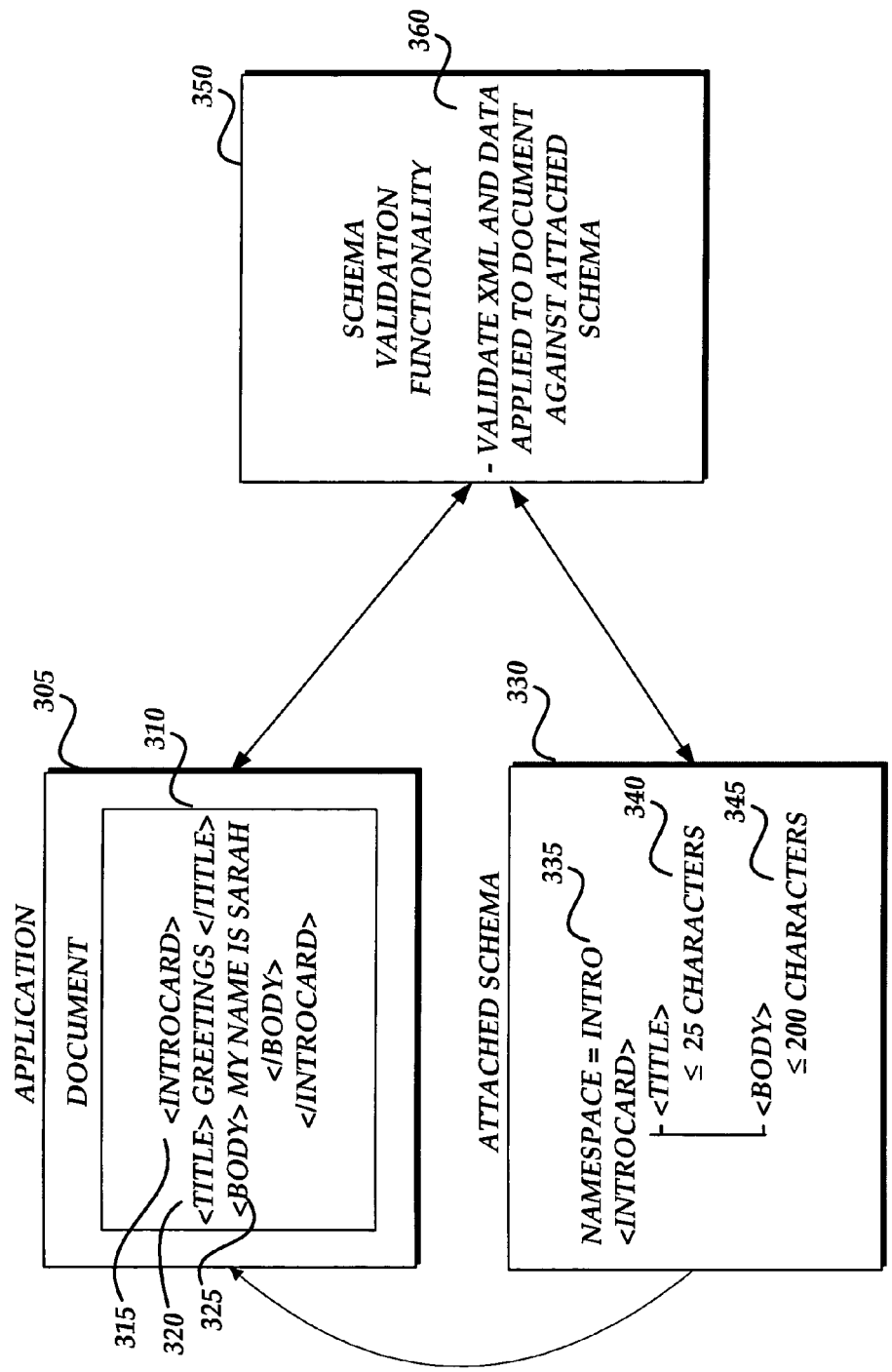
FIG. 3 is a block diagram illustrating interaction between a document, an attached schema file, and a schema validation functionality model.

As described below, embodiments of the present invention are implemented through the interaction of software objects in the use, customization, and application of components of the Extensible Markup Language (XML). FIG. 3 is a block diagram illustrating interaction between a document, an attached schema file, and a schema validation functionality module. As is well known to those skilled in the art, the Extensible Markup Language (XML) provides a method of describing text and data in a document by allowing a user to create tag names that are applied to text or data in a document that in turn define the text or data to which associated tags are applied. For example referring to FIG. 3, the document 310 created with the application 305 contains text that has been marked up with XML tags 315, 320, 325. For example, the text "Greetings" is annotated with the XML tag <title>. The text "My name is Sarah" is annotated with the <body> tag. According to XML, the creator of the <title> and <body> tags is free to create her own tags for describing the tags to which those tags will be applied. Then, so long as any downstream consuming application or computing machine is provided instructions as to the definition of the tags applied to the text, that application or computing machine may utilize the data in accordance with the tags. For example, if a downstream application has been programmed to extract text defined as titles of articles or publications processed by that application, the application may parse the document 310 and extract the text "Greetings," as illustrated in FIG. 3 because that text is annotated with the tag <title>. The creator of the particular XML tag naming for the document 310, illustrated in FIG. 3, provides useful description for text or data contained in the document 310 that may be utilized by third parties so long as those third parties are provided with the definitions associated with tags applied to the text or data.

According to embodiments of the present invention, the text and XML markup entered into the document 310 may be saved according to a variety of different file formats and according to the native programming language of the application 305 with which the document 310 is created. For example, the text and XML markup may be saved according to a word processing application, a spreadsheet application, and the like. Alternatively, the text and XML markup entered into the document 310 may be saved as an XML format whereby the text or data, any applied XML markup, and any formatting such as font, style, paragraph structure, etc. may be saved as an XML representation. Accordingly, downstream or third party applications capable of understanding data saved as XML may open and consume the text or data thus saved as an XML representation. For a detailed discussion of saving text and XML markup and associated formatting and other attributes of a document 310 as XML, see U.S. patent application entitled "Word Processing Document Stored in a Single XML File that may be Manipulated by Applications that Understanding XML," U.S. Ser. No. 10/187,060, filed Jun. 28, 2002, which is incorporated herein by reference as if fully set out herein.

In order to provide a definitional framework for XML markup elements (tags) applied to text or data, as illustrated in FIG. 3, XML schema files are created which contain information necessary for allowing users and consumers of marked up and stored data to understand the XML tagging definitions designed by the creator of the document. Each schema file also referred to in the art as a Namespace or XSD file preferably includes a listing of all XML elements (tags) that may be applied to a document according to a given schema file. For example, a schema file 330, illustrated in FIG. 3, may be a schema file containing definitions of certain XML elements that may be applied to a document 310 including attributes of XML elements or limitations and/or rules associated with text or data that may be annotated with XML elements according to the schema file. For example, referring to the schema file 330 illustrated in FIG. 3, the schema file is identified by the Namespace "intro" the schema file includes a root element of <intro card>.

According to the schema file 330, the <intro card> element serves as a root element for the schema file and also as a parent element to two child elements <title> and <body>. As is well known to those skilled in the art, a number of parent elements may be defined under a single root element, and a number of child elements may be defined under each parent element. Typically, however, a given schema file 330 contains only one root element. Referring still to FIG. 3, the schema file 330 also contains attributes 340 and 345 to the <title> and <body> elements, respectfully. The attributes 340 and 345 may provide further definition or rules associated with applying the respective elements to text or data in the document 310. For example, the attribute 345 defines that text annotated with the <title> element must be less than or equal to twenty-five characters in length. Accordingly, if text exceeding twenty-five characters in length is annotated with the <title> element or tag, the attempted annotation of that text will be invalid according to the definitions contained in the schema file 330.

By applying such definitions or rules as attributes to XML elements, the creator of the schema may dictate the structure of data contained in a document associated with a given schema file. For example, if the creator of a schema file 330 for defining XML markup applied to a resume document desires that the experience section of the resume document contain no more than four present or previous job entries, the creator of the schema file 330 may define an attribute of an <experience> element, for example, to allow that no more than four present or past job entries may be entered between the <experience> tags in order for the experience text to be valid according to the schema file 330. As is well known to those skilled in the art, the schema file 330 may be attached to or otherwise associated with a given document 310 for application of allowable XML markup defined in the attached schema file to the document 310. According to one embodiment, the document 310 marked up with XML elements of the attached or associated schema file 330 may point to the attached or associated schema file by pointing to a uniform resource identifier (URI) associated with a Namespace identifying the attached or associated schema file 330.

According to embodiments of the present invention, a document 310 may have a plurality of attached schema files. That is, a creator of the document 310 may associate or attach more than one schema file 330 to the document 310 in order to provide a framework for the annotation of XML markup from more than one schema file. For example, a document 310 may contain text or data associated with financial data. A creator of the document 310 may wish to associate XML schema files 330 containing XML markup and definitions associated with multiple financial institutions. Accordingly, the creator of the document 310 may associate an XML schema file 330 from one or more financial institutions with the document 310. Likewise, a given XML schema file 330 may be associated with a particular document structure such as a template for placing financial data into a desirable format.

According to embodiments of the present invention, a collection of XML schema files and associated document solutions may be maintained in a Namespace or schema library located separately from the document 310. The document 310 may in turn contain pointers to URIs in the Namespace or schema library associated with the one or more schema files attached to otherwise associated with the document 310. As the document 310 requires information from one or more associated schema files, the document 310 points to the Namespace or schema library to obtain the required schema definitions. For a detailed description of the use of an operation of Namespace or schema libraries, see U.S. patent application entitled "System and Method for Providing Namespace Related Information," U.S. Ser. No. 10/184,190, filed Jun. 27, 2002, and U.S. patent application entitled "System and Method for Obtaining and Using Namespace Related Information for Opening XML Documents," U.S. Ser. No. 10/185,940, filed Jun. 27, 2002, both U.S. patent applications of which are incorporated herein by reference as if fully set out herein. For a detailed description of a mechanism for downloading software components such as XML schema files and associated solutions from a Namespace or schema library, see US patent application entitled Mechanism for Downloading Software Components from a Remote Source for Use by a Local Software Application, U.S. Ser. No. 10/164,260, filed Jun. 5, 2002.

Referring still to FIG. 3, a schema validation functionality module 350 is illustrated for validating XML markup applied to a document 310 against an XML schema file 330 attached to or otherwise associated with the document 310, as described above. As described above, the schema file 330 sets out acceptable XML elements and associated attributes and defines rules for the valid annotation of the document 310 with XML markup from an associated schema file 330. For example, as shown in the schema file 330, two child elements <title> and <body> are defined under the root or parent element <intro card>. Attributes 340, 345 defining the acceptable string length of text associated with the child elements <title> and <body> are also illustrated. As described above, if a user attempts to annotate the document 310 with XML markup from a schema file 330 attached to or associated with the document in violation of the XML markup definitions contained in the schema file 330, an invalidity or error state will be presented. For example, if the user attempts to enter a title string exceeding twenty-five characters, that text entry will violate the maximum character length attribute of the <title> element of the schema file 330. In order to validate XML markup applied to a document 310, against an associated schema file 330, a schema validation module 350 is utilized. As should be understood by those skilled in the art, the schema validation module 350 is a software module including computer executable instructions sufficient for comparing XML markup and associated text entered in to a document 310 against an associated or attached XML schema file 330 as the XML markup and associated text is entered in to the document 310.

According to embodiments of the present invention, the schema validation module 350 compares each XML markup element and associated text or data applied to the document 310 against the attached or associated schema file 330 to determine whether each element and associated text or data complies with the rules and definitions set out by the attached schema file 330. For example, if a user attempts to enter a character string exceeding twenty-five characters annotated by the <title> elements 320, the schema validation module will compare that text string against the text string attribute 340 of the attached schema file 330 and determine that the text string entered by the user exceeds the maximum allowable text string length. Accordingly, an error message or dialogue will be presented to the user to alert the user that the text string being-entered by the user exceeds the maximum allowable character length according to the attached schema file 330. Likewise, if the user attempts to add an XML markup element between the <title> and the <body> elements, the schema validation module 350 will determine that the XML markup element applied by the user is not a valid element allowed between the <title> and <body> elements according to the attached schema file 330. Accordingly, the schema validation module 350 will generate an error message or dialogue to the user to alert the user of the invalid XML markup.

Programmable Object Model for XML Markup in an Application

As described above with reference to FIG. 3, an application 305 may allow a user to apply Extensible Markup Language (XML) elements to a document 310. Further, a schema file 330 may be attached to or associated with the document 310 for providing a framework of definitions and rules for applying XML markup elements to the document 310 in accordance with a schema file 330. According to embodiments of the present invention, a user is allowed to programmatically call the XML functionality of an application 305 for gaining access to XML markup applied to a document and for editing XML markup applied to the document. Further, the user may call the XML functionality of the application 305 for setting and adding attributes on XML elements, and adding elements, in spite of an attached or associated schema file 330. Access to the XML functionality of the application 305 also allows a user to access richly formatted text or data contents contained within an XML node or to find specific XML nodes (elements) in the document 310 by using one or more XML XPath queries.

According to embodiments of the present invention, a user may access the XML functionality of an application by sending one or more object-oriented message calls or application programming interfaces to the XML functionality of the application 305 as described above with reference to FIG. 2. By exposing the user to the XML functionality of the application 305, the user may programmatically call the XML functionality of the application 305, directly through use of provided message calls or API's or from a third party software application capable of communicating with the .XML functionality of the application 305 via object-oriented message calls or API's. The user may prepare a third party application according to a variety of different programming languages such as C, C++, C#, Visual Basic, and the like.

FIG. 4 is a block diagram illustrating interaction between a third party application and the XML functionality of an application 305. Referring to the block diagram illustrated in FIG. 4, an application 305 is illustrated having a document 310 in which has been entered XML markup elements 315, 320, 325 and associated text. To the right of the document 310 is an XML markup pane 405 for providing the user a tree-structured outline including an identification of a schema file or Namespace 410 attached to the document 310 and showing the root element or parent element 420 and associated child elements 430, 440, 450, 460, 480. An attribute 470 is shown associated with the child element 460. As is well known to those skilled in the art, and as described above with reference to FIG. 3, the user operating the software application 305 may apply XML elements from an associated or attached XML schema file to the document 310, as illustrated in FIG. 4.

According to embodiments of the present invention, and as described above, the user may programmatically access the XML functionality of the software application to customize or otherwise manipulate the application of XML elements from the associated or attached schema file 330 to the document 310. For example, the user may desire to programmatically insert additional XML markup into the document at a specified range by sending an object-oriented message call specifying a method for inserting a given XML markup element into a particular range within the document. For another example, the user may desire to apply an Extensible Stylesheet Language Transformation (XSLT) to the document 310 in order to transform the document 310 to a format required by the user, for example HTML format. In order to effect such a transformation, the user is provided an object-oriented message call for calling the XML functionality of the application 305 and for providing the location of a desired XSLT transformation file for applying to the document 310.

The following is a description of objects and associated properties comprising object-oriented message calls (application programming interfaces) provided to a user for allowing the user to directly access the XML functionality of the software application 305, as described above. Following each of the objects or associated properties set out below is a description of the operation and functionality of the object or associated property.

Application Object
The following are properties and methods of this object related to XML markup.
  .PrintXMLTag Property
  A property controlling whether XML tags are printed out together with the contents of the document.

Document Object
The following are properties and methods of this object related to XML markup.
  .TranformDocument
  A method to transform the XML document using an XSLT transformation and open its output. It can accept the following parameters.
  Path—location to the XSLT transformation file.
  DataOnly—a flag indicating whether what is passed to the transformation is the entire XML representation of the document (including native XML representations) or only the non-native XML markup embedded in the document.
  .XMLAfterInsert Event
  An event firing right after a new XML element is inserted into the document by a user action. This event firing passes the following parameters to an event handler procedure.
  NewXMLNode—a pointer to the new XML node object being inserted
  InUndoRedo—a flag indicating whether the insertion occurred as a result of an Undo or Redo action in the application.
  .XMLBeforeDelete Event
  An event firing right before an XML element is deleted from the document by a user action. This event firing passes the following parameters to an event handler procedure.
  DeletedRange—an object pointing to the area of the document being affected by the deletion.
  OldXMLNode—a pointer to the XML node being deleted.
  InUndoRedo—a flag indicating whether the deletion occurred as a result of an Undo or Redo action in the application.
  .XMLHideNamespaces Property
  A property controlling the appearance of the Namespace text when the element name shows up in the application's user interface.

XMLNodes Property
  A read only property pointing to an XMLNodes collection representing all the XML nodes in the document.
  .XMLSaveDataOnly Property
  A property controlling how the application saves the XML markup embedded in its document, including whether it is only that markup and the text contents, or whether it has other data that may be native to the application and created automatically.
  .XMLSaveThroughXSLT Property
  A property controlling the location of the XSLT transform to be applied by the application to the document automatically upon saving the document so that only the output of the XSLT transformation is saved.
  .XMLUseXSLTWhenSaving Property
  A property that controls whether an XSLT transform should automatically be applied to a document right before the document is saved so that only the results of that transformation are saved.

View Object
The following are properties and methods of this object related to XML markup.
  .ShowXMLMarkup Property
  A property that controls whether or not the XML markup embedded in the document is visible to the user as part of the text the user is editing in the document.

XMLSchemaReferences collection object—an object for providing access to XMLSchemaReference objects. This object represents the schemas attached to the document that the XML markup is based on and validated against. The following are methods and properties of the object that are relevant to the XML markup object model.
  .ShowPlaceholderText Property
  A property controlling the automatic appearance of element names as visible placeholders in the document whenever the elements empty and when the tags themselves are not visible.

Range object—this is an object representing an arbitrary part of a document's content. The following are properties and methods of this object related to XML markup.
  .InsertXML( ) Method
  A method for inserting XML markup into the document at the location represented by the Range object. It can accept the following parameters.
  XML—the text string with the XML markup being inserted.
  Transform—an XSLT transformation to be applied to the inserted markup right before it is inserted into the document.
  .XML Property
  A read only property returning the XML representation of the area of the document represented by the Range object. This property can accept the following parameters.
  DataOnly—a flag indicating that only the XML markup non-native to the application is to be returned.
  .XMLNodes Property
  A read only property returning the pointer to the XMLNodes collection representing all the XML elements located in the area of the document represented by the Range object.
  .XMLParentNode Property
  A read only property returning the innermost XML element in the document that contains the area represented by the Range object.

Selection object—an object representing the currently selected part of a document's content. The following are properties and methods of this object related to XML markup.

.InsertXML( ) Method

A method for inserting XML markup into the document at the location represented by the Selection object. This method can accept the following parameters.

XML—the text string with the XML markup being inserted.

Transform—an XSLT transformation to be applied to the inserted markup right before it is inserted into the document.

.XML Property

A read only property returning the XML representation of the area of the document represented by the Selection object. This property can accept the following parameters.

DataOnly—a flag indicating that only the XML markup non-native to the application is to be returned.

.XMLNodes Property

A read only property returning the pointer to the XMLNodes collection representing all the XML elements located in the selected area of the document represented by the Selection object.

.XMLParentNode Property

A read only property returning the innermost XML element in the document that contains the selected area represented by the Selection object.

XMLNodes collection object—an object representing a collection of XMLNode objects. The following are properties and methods of this object related to XML markup.

.Add( ) Method

A method to create and add to the collection a new XMLNode object and apply it to the selected part of the document. The method can accept the following parameters.

Name—the name of the XML element to be created.

Namespace—the URI of that element determining which Namespace it is a member.

Range—a pointer to the part of the document to which this XML node is to be applied.

.Application Property

A read only pointer to the application object representing the application of this object model.

.Count Property

A read only property returning the number of XML nodes in the collection.

.Creator Property

A read only pointer to the creator of the object.

.Item( ) Method

A method for accessing the individual members of this collection using an numerical index or a search keyword. The method can accept the following parameters:

Index—a number representing the position of the requested XMLNode object in the Namespace library. The method can also be a text string representing the name of the requested node.

.Parent Property

A read only property returning the parent object of the collection. This property returns a pointer to the document object from which the XMLNodes collection is accessed.

XMLNode object—an object representing an XML node in the document. The following are properties and methods of this object related to XML markup.

.Application Property

A read only pointer to the application object representing the application of this object model.

.Attributes Property

A read only property pointing to the XMLNodes collection consisting of all the attribute nodes associated with this XML node object.

.BaseName Property

A property returning the name of this XML element without any prefixes.

.ChildNodes Property

A property pointing to the XMLNodes collection that consists of all the elements that are child nodes of this element.

.Copy( ) Method

A method to copy this XML element and all of its contents to the clipboard.

.Creator Property

A read only pointer to the creator of the object.

.Cut( ) Method

A method to copy this XML element and all of its contents to the clipboard and to remove that element and its contents from the document.

.Delete( ) Method

A method to remove this XML element from the document without affecting its contents.

.FirstChild Property

A property pointing to the first XML element that is a child of this XML element.

.HasChildNodes Property

A property indicating whether the XML element represented by this object has any child nodes or is empty.

.LastChild Property

A property pointing to the last XML element that is a child of this XML element.

.Level Property

A property indicating whether the XML element represented by this object is at the inline level, the paragraph level, the table cell level, the table row level, the table level or any other special level supported by the application.

.NamespaceURI Property

A property returning the URI of the Namespace of the XML element represented by this object.

.NextSibling Property

A property returning a pointer to the XMLNode object that represents the next element following the element represented by this object.

.NodeType Property

A property indicating the type of the XML node represented by this object. For example, it can determine whether the node is an element, or an attribute, or a text node or an annotation.

.NodeValue Property

A property representing the text value to which the node represented by this object has been set.

OwnerDocument Property

A property returning a pointer to the document object in which this XML element is positioned.

.Parent Property

A read only property returning the parent object of this object. This property returns a pointer to the collection of which the XMLNode object is a member.

.Parentnode Property

A property returning a pointer to the object that represents the XML node of which this element is a child.

.PlaceholderText Property

A property controlling the placeholder text that shows up in place of elements when those elements are empty and their tags are not visible.

.PreviousSibling Property

A property returning a pointer to the XMLNode object that represents the previous element before the element represented by this object.

.Range Property

A property returning a pointer to the Range object that represents the part of the document that the XML element contains. This provides a direct link between the XML markup in the document and the rich contents of the document, including data native to the application.

.RemoveChild( ) Method

A method to remove an XML node that is a child of the node represented by this object. It can accept the following parameters.

ChildNode—a pointer to the XMLNode object that represents the child XML element to be removed.

.SelectNodes( ) Method

A method to find all XML nodes in the document that match a specific query in the XPath language. It returns an XMLNodes collection consisting of all the XML nodes matching the query. It can accept the following parameters.

XPath—the xpath expression describing the query.

PrefixMapping—a mapping of prefixes to Namespaces used in the XPath expression.

FastSearchSkippingTextNodes—a performance optimization parameter that determines whether the text contents of XML elements should be included in the search or if the search is only to be applied to the XML markup.

.SelectSingleNode( ) Method

A method to find the first XML node in the document that matches a specific query in the XPath language. It returns an XMLNode object matching the query. It can accept the following parameters.

XPath—the xpath expression describing the query.

PrefixMapping—a mapping of prefixes to Namespaces used in the XPath expression.

FastSearchSkippingTextNodes—a performance optimization parameter that determines whether the text contents of XML elements should be included in the search or if the search is only to be applied to the XML markup.

.SmartTag Property

A pointer to the SmartTag object associated with this XML element.

.Text Property

A property returning the plain text contents of the XML element.

.XML Property

A property returning the XML markup representation of the XML element and all of its contents. It can accept the following parameters.

DataOnly—a flag indicating that only the XML markup non-native to the application is to be returned.

As described herein, methods and systems are provided for allowing a user to programmatically access the Extensible Markup Language (XML) functionality of an application for accessing and customizing XML markup applied to a document created by the application and for controlling XML markup definitions and rules applied to the document by one or more associated or attached XML schema files. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for programmatically accessing the functionality of an Extensible Markup Language (XML) capable software application, comprising:

accessing a document the document being configured to include one or more XML elements;

calling a software application via an object-oriented message call;

passing an object property to the software application, the object property being associated with XML functionality of the software application, and passing the object property to the software application includes passing an object method to the software application for transforming an XML document, the method object including as a parameter a path to an XSLT transformation file for transforming the XML document according to the XSLT transformation file;

in response to the message call and the object property passed to the software application, receiving access to the XML functionality of the software application associated with the object property passed to the software application, the XML functionality including a plurality of functions, each of the functions being selectively accessed based on at least one of the message call and the object property, the functions including:

validating data included in the one or more XML elements according to an XML schema associated with the document;

determining if the data in the one or more XML elements is modifiable according to the XML schema;

identifying a location of the one or more XML elements in the document;

using a message call for inserting the XML element into a location within the document;

and presenting one or more properties applied to the data by the XML schema, allowing the user to at least one of view and modify the one or more properties; and presenting an interface to the user allowing the user to engage the XML functionality.

2. The method of claim 1, whereby the method object passed to the software application further includes a parameter indicating whether the XSLT transformation file is to be applied to all data contained in the XML file or whether the XSLT transformation file is to be applied to only non-native XML markup data applied to the XML document.

3. The method of claim 1, whereby passing the object property to the software application includes passing an object property to the software application for controlling the appearance of an associated schema file text when an XML element associated with the schema file text is to be presented in the software application's user interface.

4. The method of claim 1, whereby passing the object property to the software application includes passing an object property for controlling how the software application saves XML markup applied to a document.

5. The method of claim 1, whereby passing the object property for controlling how the software application saves the XML markup applied to the document includes passing an object property for causing the software application to save the XML markup applied to the document according to the native XML functionality of the software application without application of any XSLT transformation prior to saving the XML markup applied to the document.

6. The method of claim 1, whereby passing the object property to the software application includes passing an object property to the software application for causing the application to save only XML markup and associated data applied to the document.

7. The method of claim 1, whereby passing the object property to the software application includes passing an object property to the software application for causing the software application to apply and XSLT transformation to the XML markup and associated data applied to the document and any non-XML data contained in the document prior to saving the document.

8. The method of claim 1, whereby passing the object property to the software application includes passing the object property for causing the software application to apply the XSLT transformation to only the non-XML data contained in the document prior to saving the XML document.

9. The method of claim 1, whereby passing an object property to the software application includes passing an object property for controlling the location of an XSLT transformation to be applied by the software application to a document upon saving the document such that only the output of the XSLT transformation is saved.

10. The method of claim 1, whereby passing an object property to the software application includes passing an object property for controlling whether an XSLT transformation should automatically be applied to a document before the document is saved, such that only the results of the transformation are saved.

11. The method of claim 1, whereby passing an object property to the software application includes passing an object property for controlling whether XML markup applied to a document is displayed to the user along with text being edited by the user in a document.

12. The method of claim 1, whereby passing an object property to the software application includes passing an object property for controlling an appearance of an XML element name as a visible placeholder in a document where no data has been entered for the XML element.

13. The method of claim 1, whereby passing an object property to the software application includes passing a method property for inserting XML markup into a document at a specified location, whereby a text string associated with the XML markup to be inserted and whereby any XSLT transformations to be applied to the inserted markup are passed as parameters to the method property.

14. The method of claim 1, whereby passing an object property to the software application includes passing a method object to the software application for creating an XML nodes collection object and for adding to the XML nodes collection object any new XML node objects, whereby a name for a new XML node object, a uniform resource identifier identifying a Namespace associated with a new XML node object, and a range pointer to a location in a document where the new XML node object is to be applied are passed to the software application as parameters of the method object.

15. The method of claim 14, whereby passing an object property to the software application includes passing a method object for accessing individual XML node objects contained in the collection of XML node objects, whereby an identification representing the position of a requested XML node object in a Namespace library is passed as a parameter of the method object.

16. The method of claim 1, whereby passing an object property to the software application includes passing an object property for returning a base name of a specified XML elements.

17. The method of claim 1, whereby passing an object property to the software application includes passing an object property for pointing to an XML nodes collection that consists of all XML elements that are child elements for a specified element.

18. The method of claim 1, whereby passing an object property to the software application includes passing a method property to the software application for copying a specified XML element and all data associated with the XML element for pasting to a separate location within a document.

19. The method of claim 1, whereby passing an object property to the software application includes passing an object property for copying an XML element and all data associated with the XML element and for removing the copied XML element and the copied data associated with the XML element from a document from which the XML element and the data associated with the XML element are copied.

20. The method of claim 1, whereby passing an object property to the software application includes passing a method property for removing a specified XML element from a document without affecting data associated with the XML element.

21. The method of claim 1, whereby passing an object property to the software application includes passing an object property for pointing to a first XML element that is a child element of a specified XML element.

22. The method of claim 1, whereby passing an object property to the software application includes passing an object property for indicating whether an XML element has any child elements that contain no associated data.

23. The method of claim 1, whereby passing an object property to the software application includes passing an object property for pointing to a last XML element that is a child element of a specified XML element.

24. The method of claim 1, whereby passing an object property to the software application includes passing an object property for indicating whether an XML element is at an inline level, a paragraph level, a table cell level, a table row level, a table level, or other levels supported by the software application.

25. The method of claim 1, whereby passing an object property to the software application includes passing an object property for returning the uniform resource identifier of an XML schema file associated with a specified XML element.

26. The method of claim 1, whereby passing an object property to the software application includes passing an object property for returning a pointer to an XML node that represents a next XML element immediately following a specified XML element.

27. The method of claim 1, whereby passing an object property to the software application includes passing an object property for indicating a type of an XML element, whereby the type of the XML element may include an XML element or an attribute of an XML element.

28. The method of claim 1, whereby passing an object property to the software application includes passing an object property for returning a pointer to a document containing a specified XML element.

29. The method of claim 1, whereby passing an object property to the software application includes passing an object property for returning a pointer to an XML element that is a parent XML element of a specified XML element.

30. The method of claim 1, whereby passing an object property to the software application includes passing an object property for controlling whether a placeholder text is displayed in place of XML elements applied to an XML element applied to a document when the XML element contains no associated data.

31. The method of claim 1, whereby passing an object property to the software application includes passing an object property for returning a pointer to an XML element that is a previous XML element before a specified XML element.

32. The method of claim 1, whereby passing an object property to the software application includes passing an object property for returning a pointer to a range in a document contained by a specified XML element.

33. The method of claim 1, whereby passing an object property to the software application includes passing a method property for removing an XML element that is a child XML element of a specified XML element, whereby a pointer to the child XML element is passed with the method object as a parameter.

34. The method of claim 1, whereby passing an object property to the software application includes passing a method property for finding all XML elements in a document that match a specified XPath query whereby an XML elements collection consisting of all XML elements matching the specified XPath query are returned.

35. The method of claim 1, whereby passing an object property to the software application includes passing an object property for returning as plain text any data entered into a document associated with a specified XML element.

36. The method of claim 1, whereby passing an object property to the software application includes passing an object property for returning an XML markup representation of a specified XML element and all data associated with the specified element.

37. A computer-readable storage media storing instructions executable by a computing system for providing a programmable object model for an Extensible Markup Language (XML) capable application, comprising:

accessing a document, the document being configured to include one or more XML elements;

calling a software application via an object-oriented message call;

passing an object property to the software application, the object property being associated with XML functionality of the software application, and passing the object property to the software application includes passing an object method to the software application for transforming an XML document, the method object including as a parameter a path to an XSLT transformation file for transforming the XML document according to the XSLT transformation file;

in response to the message call and the object property passed to the software application, receiving access to the XML functionality of the software application associated with the object property passed to the software application, the XML functionality including a plurality of functions, each of the functions being selectively accessed based on at least one of the message call and the object property, the functions including:

validating data included in the one or more XML elements according to an XML schema associated with the document;

determining if the data in the one or more XML elements is modifiable according to the XML schema;

identifying a location of the one or more XML elements in the document;

using a message call for inserting the XML element into a location within the document;

and presenting one or more properties applied to the data by the XML schema, allowing the user to at least one of view and modify the one or more properties; and presenting an interface to the user allowing the user to engage the XML functionality.

* * * * *